US011392617B2

(12) United States Patent
Puvvada et al.

(10) Patent No.: US 11,392,617 B2
(45) Date of Patent: Jul. 19, 2022

(54) RECOVERING FROM A FAILURE OF AN ASYNCHRONOUS REPLICATION NODE

(71) Applicant: International Business Machines Corporation, Armonk, NY (US)

(72) Inventors: Venkateswara Rao Puvvada, Inkollu (IN); Karrthik Kalaga Gopalakrishnan, Kodaikanal (IN); Saket Kumar, Bettiah (IN); Ashish Pandey, Pune (IN)

(73) Assignee: International Business Machines Corporation, Armonk, NY (US)

(*) Notice: Subject to any disclaimer, the term of this patent is extended or adjusted under 35 U.S.C. 154(b) by 15 days.

(21) Appl. No.: 16/831,578

(22) Filed: Mar. 26, 2020

(65) Prior Publication Data

US 2021/0303594 A1 Sep. 30, 2021

(51) Int. Cl.
| | | |
|---|---|---|
| *G06F 16/27* | (2019.01) | |
| *G06F 11/20* | (2006.01) | |
| *H04L 67/1095* | (2022.01) | |
| *H04L 69/40* | (2022.01) | |
| *H04L 45/00* | (2022.01) | |
| *H04L 45/28* | (2022.01) | |
| *H04L 47/122* | (2022.01) | |
| *H04L 41/5025* | (2022.01) | |
| *H04L 41/084* | (2022.01) | |

(52) U.S. Cl.
CPC ......... *G06F 16/273* (2019.01); *G06F 11/202* (2013.01); *G06F 11/2082* (2013.01); *H04L 41/0843* (2013.01); *H04L 41/5025* (2013.01); *H04L 45/22* (2013.01); *H04L 45/28* (2013.01); *H04L 47/122* (2013.01); *H04L 67/1095* (2013.01); *H04L 69/40* (2013.01)

(58) Field of Classification Search
None
See application file for complete search history.

(56) References Cited

U.S. PATENT DOCUMENTS

| 10,567,500 | B1 * | 2/2020 | Leshinsky | H04L 67/1097 |
|---|---|---|---|---|
| 11,044,007 | B2 * | 6/2021 | Whitefield | H04B 7/18541 |
| 2003/0140210 | A1 * | 7/2003 | Testardi | G06F 12/0292 |
| | | | | 711/203 |
| 2005/0192035 | A1 * | 9/2005 | Jiang | H04W 8/26 |
| | | | | 455/461 |

(Continued)

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.

(Continued)

*Primary Examiner* — Davoud A Zand
(74) *Attorney, Agent, or Firm* — Zilka-Kotab, P.C.

(57) ABSTRACT

A computer-implemented method according to one embodiment includes initializing a new gateway node at a first site in response to a failure of an old gateway node at the first site; creating, at the new gateway node, a list of dirty directories at the first site; synchronizing, with a second site by a background thread at the first site, all directories within the list of dirty directories; and synchronizing, with the second site by a foreground thread at the first site, new operations performed within the first site after the initialization of the new gateway node.

19 Claims, 7 Drawing Sheets

(56) References Cited

U.S. PATENT DOCUMENTS

| | | | |
|---|---|---|---|
| 2007/0016754 A1* | 1/2007 | Testardi | G06F 3/0635 |
| | | | 711/206 |
| 2013/0103650 A1* | 4/2013 | Natanzon | G06F 11/2069 |
| | | | 707/684 |
| 2016/0048408 A1* | 2/2016 | Madhu | G06F 11/2023 |
| | | | 718/1 |
| 2016/0103850 A1 | 4/2016 | Gupta et al. | |
| 2017/0060701 A1* | 3/2017 | Dave | G06F 11/1662 |
| 2018/0260125 A1* | 9/2018 | Botes | G06F 3/067 |
| 2019/0095293 A1* | 3/2019 | Zhang | G06F 11/2069 |
| 2019/0370380 A1 | 12/2019 | Krojzl et al. | |
| 2020/0012659 A1* | 1/2020 | Dageville | G06F 16/245 |
| 2020/0026627 A1 | 1/2020 | Chen et al. | |
| 2020/0050687 A1 | 2/2020 | Kaushik et al. | |

OTHER PUBLICATIONS

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

* cited by examiner

RECOVERING FROM A FAILURE OF AN ASYNCHRONOUS REPLICATION NODE

BACKGROUND

The present invention relates to asynchronous data replication, and more particularly, this invention relates to recovering from a failure of a node performing such replication.

Asynchronous replication is a valuable tool used to maintain, at a second location, an updated copy of data stored at a first location. A node within the first location (such as a gateway node) may help facilitate this asynchronous replication using a queue that stores operations to be replicated. However, current methods for recovery in response to a failure of the gateway node involve a significant use of processing and storage resources and can take an excessive amount of time to implement.

BRIEF SUMMARY

A computer-implemented method according to one embodiment includes initializing a new gateway node at a first site in response to a failure of an old gateway node at the first site; creating, at the new gateway node, a list of dirty directories at the first site; synchronizing, with a second site by a background thread at the first site, all directories within the list of dirty directories; and synchronizing, with the second site by a foreground thread at the first site, new operations performed within the first site after the initialization of the new gateway node.

According to another embodiment, a computer program product for recovering from a failure of an asynchronous replication node includes a computer readable storage medium having program instructions embodied therewith, where the computer readable storage medium is not a transitory signal per se, and where the program instructions are executable by a processor to cause the processor to perform a method including initializing a new gateway node at a first site in response to a failure of an old gateway node at the first site, utilizing the processor; creating, at the new gateway node, a list of dirty directories at the first site, utilizing the processor; synchronizing, with a second site by a background thread at the first site, all directories within the list of dirty directories, utilizing the processor; and synchronizing, with the second site by a foreground thread at the first site, new operations performed within the first site after the initialization of the new gateway node, utilizing the processor.

According to another embodiment, a system includes a processor; and logic integrated with the processor, executable by the processor, or integrated with and executable by the processor, where the logic is configured to initialize a new gateway node at a first site in response to a failure of an old gateway node at the first site; create, at the new gateway node, a list of dirty directories at the first site; synchronize, with a second site by a background thread at the first site, all directories within the list of dirty directories; and synchronize, with the second site by a foreground thread at the first site, new operations performed within the first site after the initialization of the new gateway node.

Other aspects and embodiments of the present invention will become apparent from the following detailed description, which, when taken in conjunction with the drawings, illustrate by way of example the principles of the invention.

DETAILED DESCRIPTION

Figure 1:
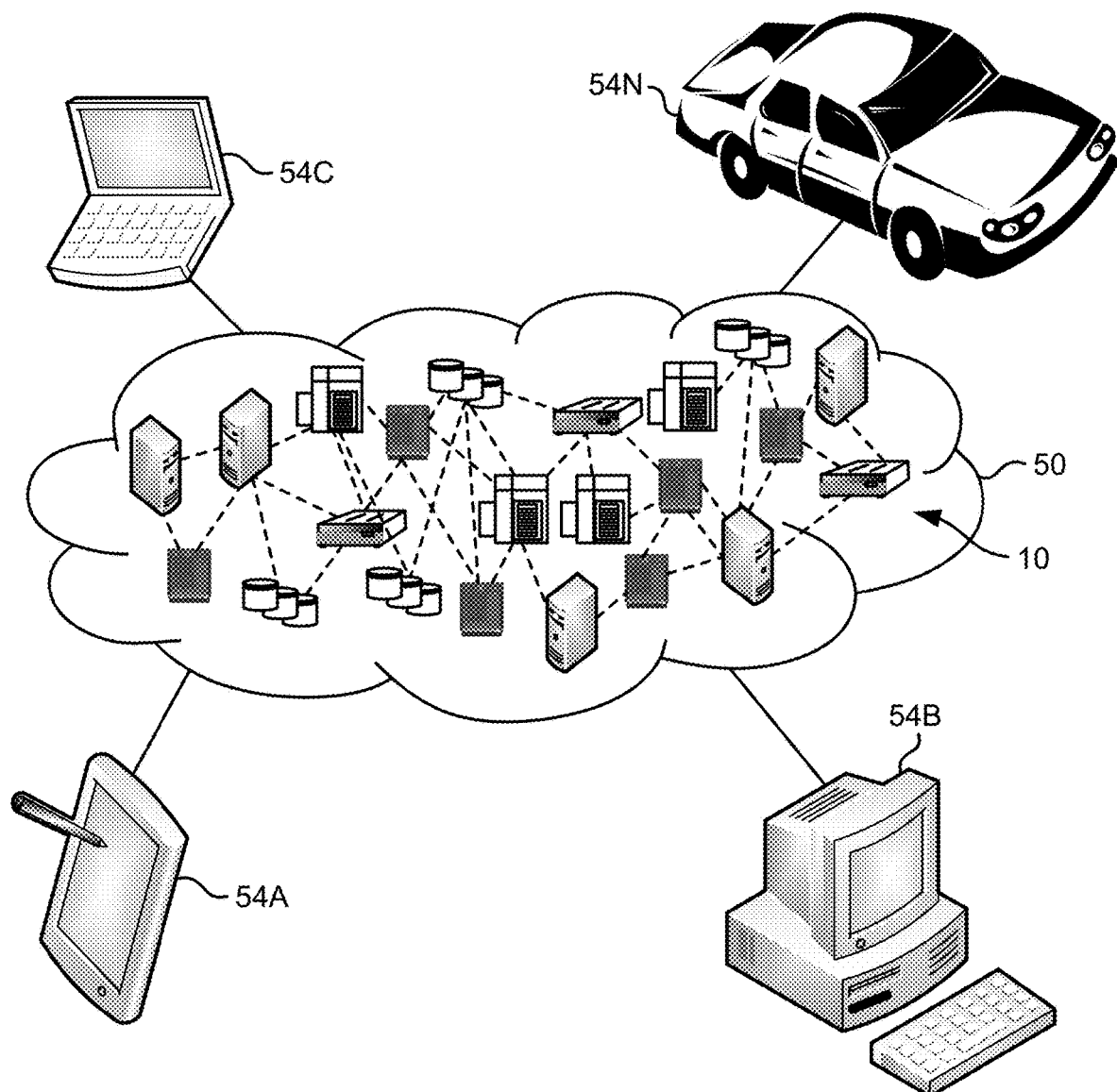
FIG. 1 depicts a cloud computing environment in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of recovering from a failure of an asynchronous replication node.

In one general embodiment, a computer-implemented method includes initializing a new gateway node at a first site in response to a failure of an old gateway node at the first site; creating, at the new gateway node, a list of dirty directories at the first site; synchronizing, with a second site by a background thread at the first site, all directories within the list of dirty directories; and synchronizing, with the second site by a foreground thread at the first site, new operations performed within the first site after the initialization of the new gateway node.

In another general embodiment, a computer program product for recovering from a failure of an asynchronous replication node includes a computer readable storage medium having program instructions embodied therewith, where the computer readable storage medium is not a transitory signal per se, and where the program instructions are executable by a processor to cause the processor to perform a method including initializing a new gateway node at a first site in response to a failure of an old gateway node at the first site, utilizing the processor; creating, at the new gateway node, a list of dirty directories at the first site, utilizing the processor; synchronizing, with a second site by a background thread at the first site, all directories within the list of dirty directories, utilizing the processor; and synchronizing, with the second site by a foreground thread at the first site, new operations performed within the first site after the initialization of the new gateway node, utilizing the processor.

In another general embodiment, a system includes a processor; and logic integrated with the processor, executable by the processor, or integrated with and executable by the processor, where the logic is configured to initialize a new gateway node at a first site in response to a failure of an old gateway node at the first site; create, at the new gateway node, a list of dirty directories at the first site; synchronize, with a second site by a background thread at the first site, all directories within the list of dirty directories; and synchronize, with the second site by a foreground thread at the first site, new operations performed within the first site after the initialization of the new gateway node.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
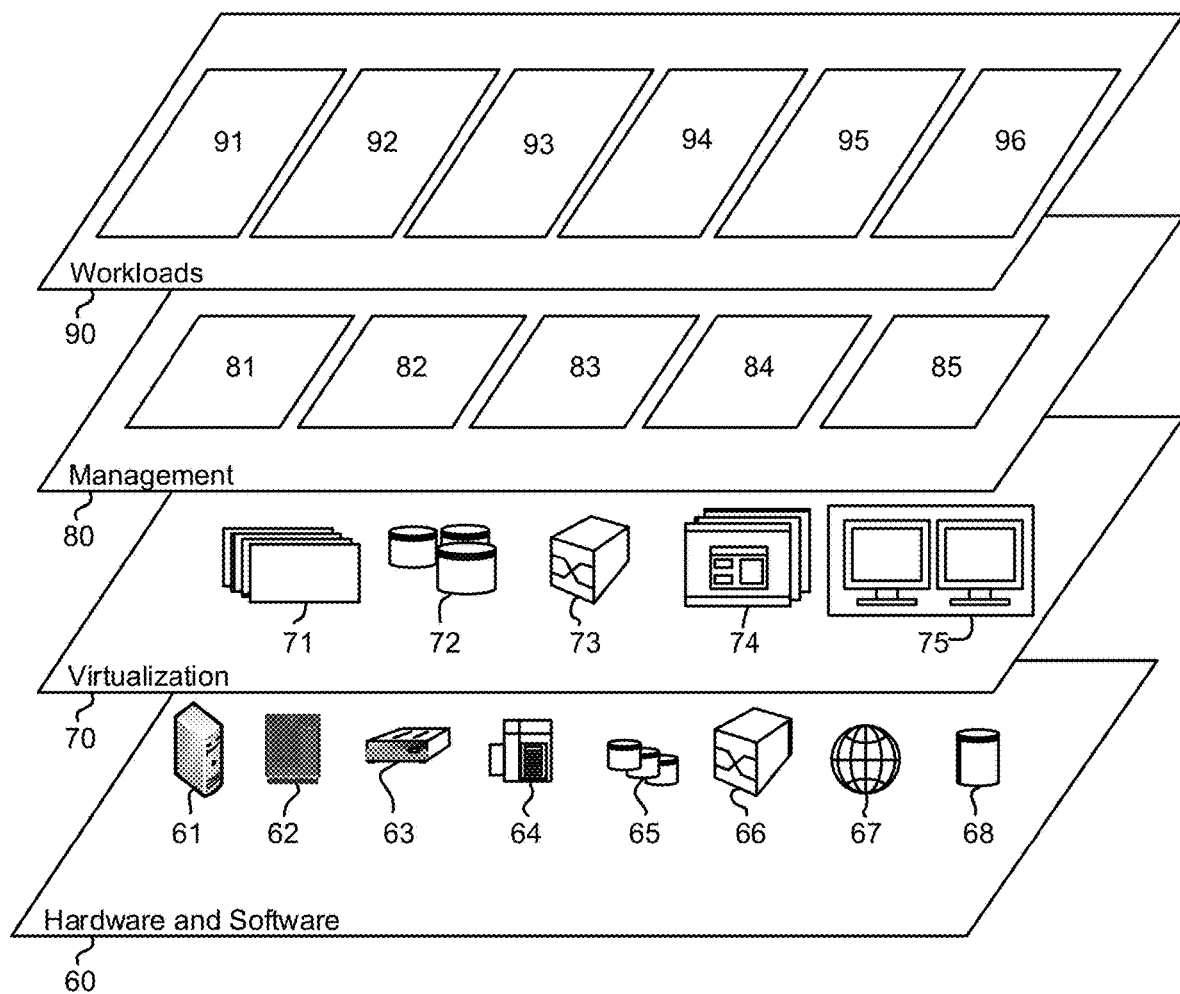
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and asynchronous replication 96.

Figure 3:
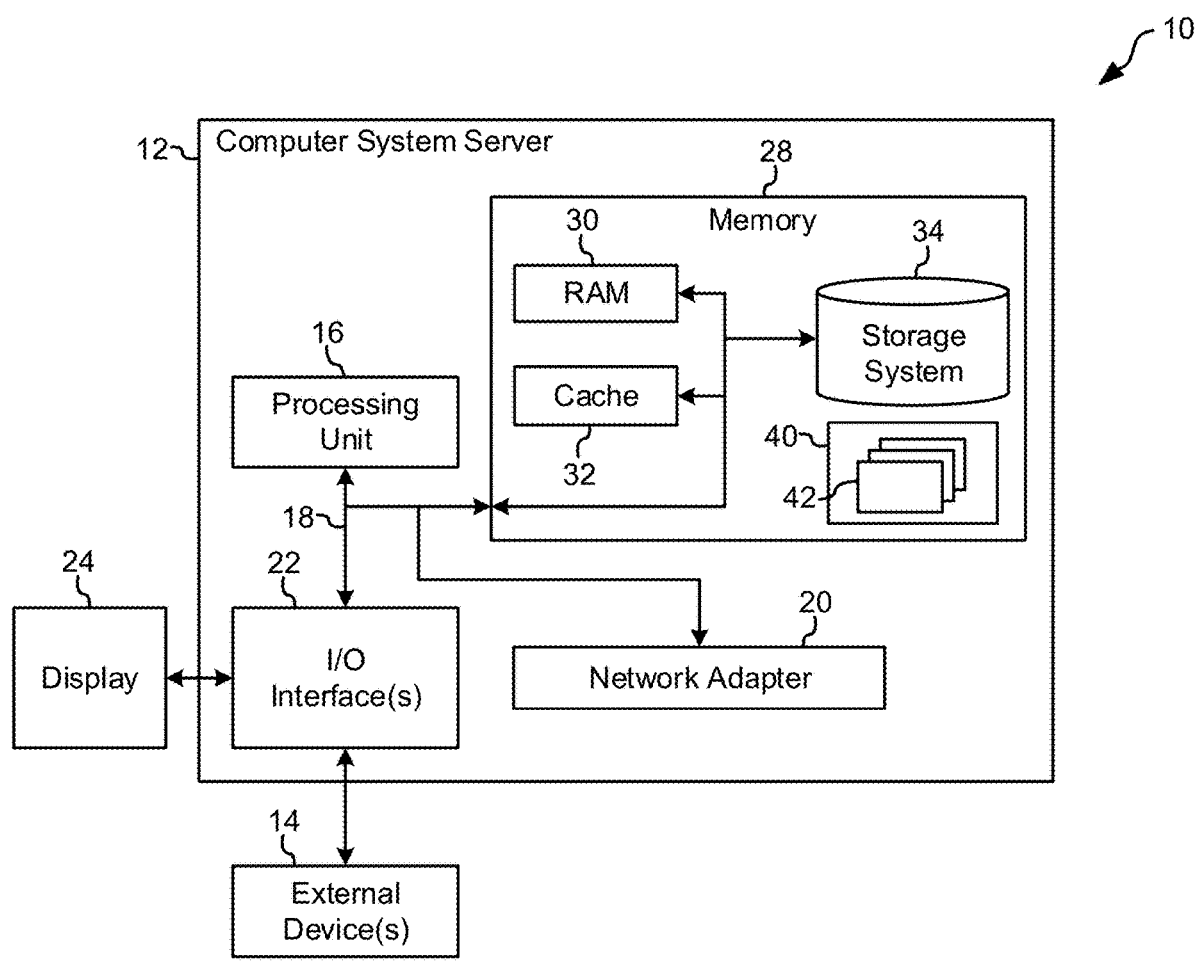
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
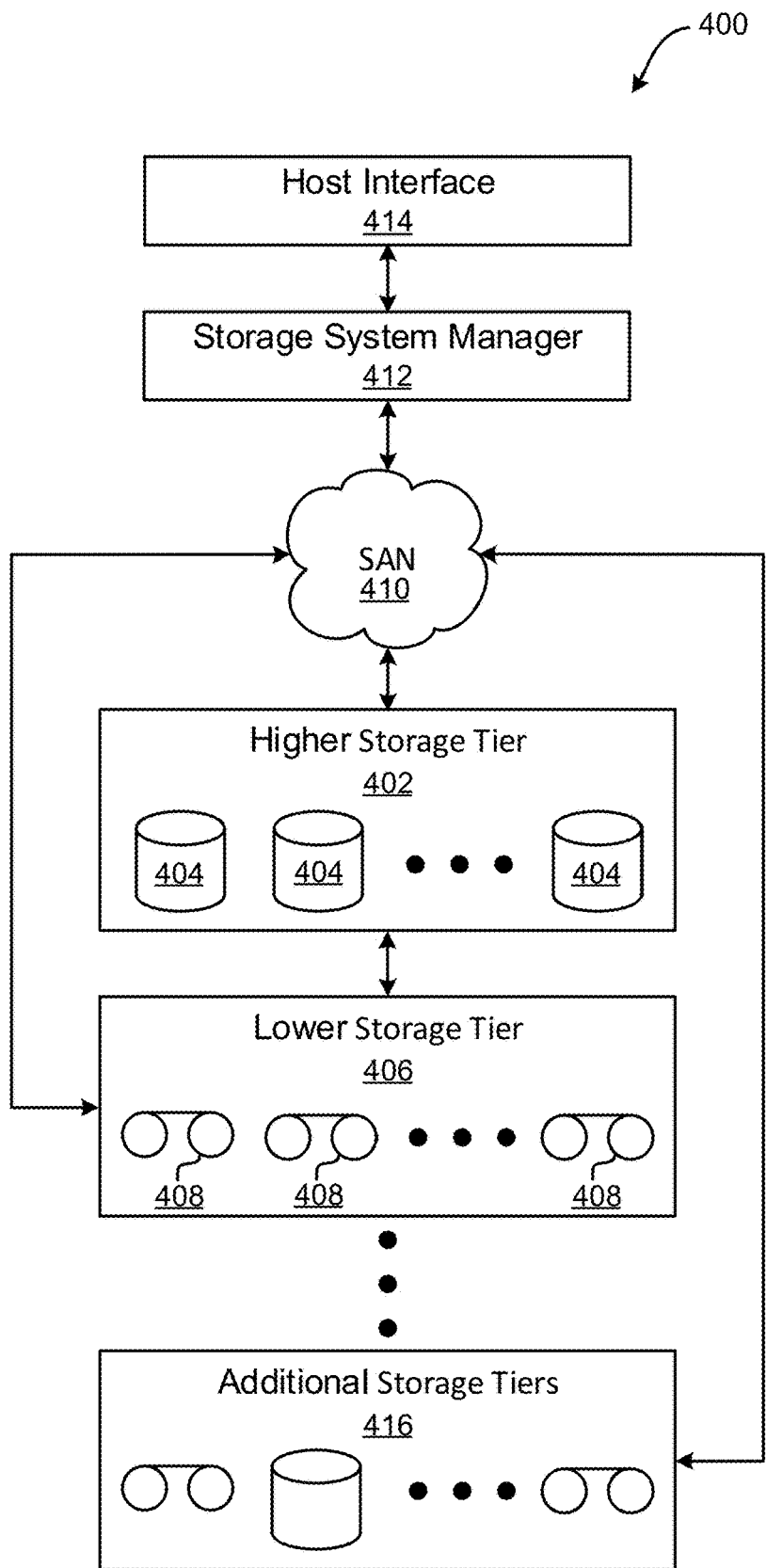
FIG. 4 illustrates a tiered data storage system in accordance with one embodiment of the present invention.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
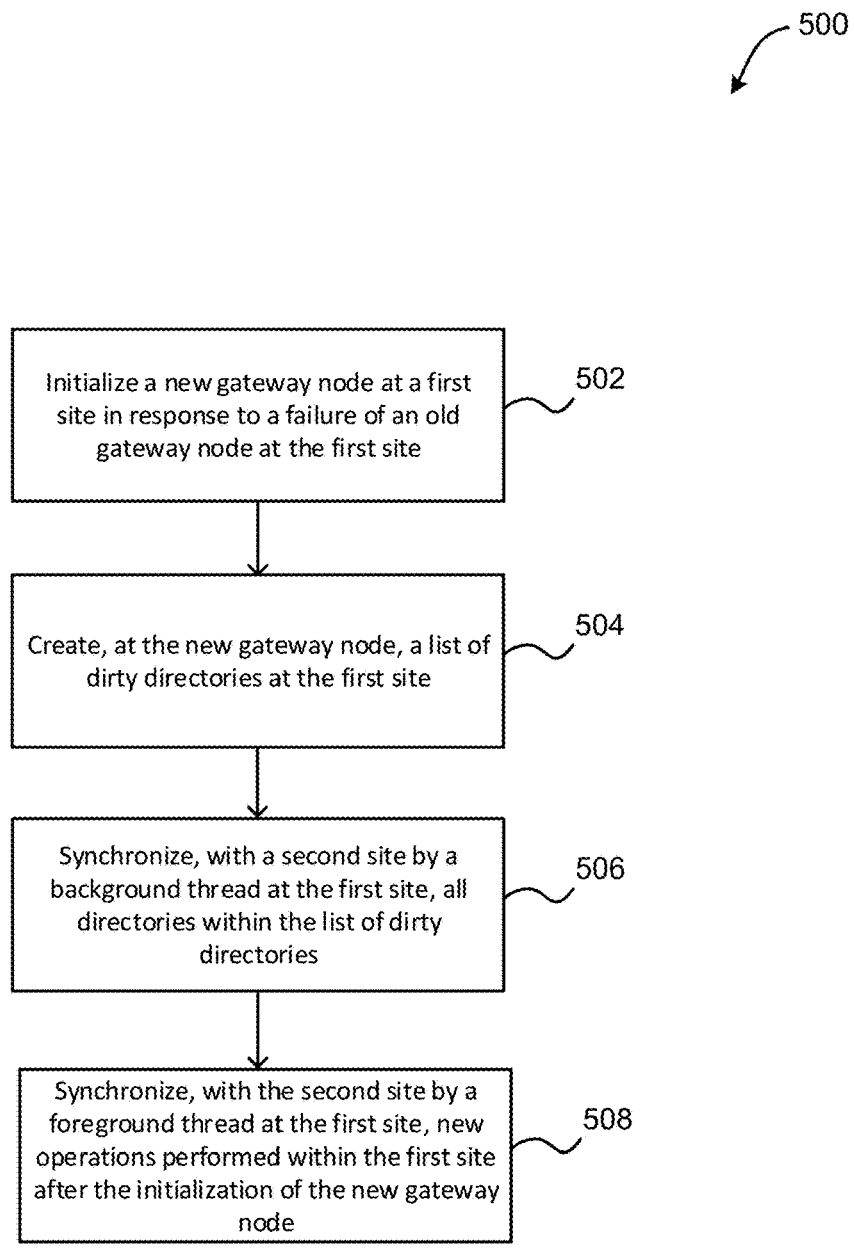
FIG. 5 illustrates a flowchart of a method for recovering from a failure of an asynchronous replication node, in accordance with one embodiment of the present invention.

Now referring to FIG. 5, a flowchart of a method 500 is shown according to one embodiment. The method 500 may be performed in accordance with the present invention in any of the environments depicted in FIGS. 1-4 and 7, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a new gateway node is initialized at a first site in response to a failure of an old gateway node at the first site. In one embodiment, the first site may include a primary site (e.g., a production site, etc.). In another embodiment, asynchronous replication may be performed on a periodic basis between the first site and a second site (e.g., a disaster recovery (DR) site, etc.).

Additionally, in one embodiment, the first site and the second site may be located in different physical locations. In another embodiment, the first site may be an on-premises site, and the second site may be cloud-based. In yet another embodiment, the second site may maintain a copy of data found at the first site. In still another embodiment, operations being performed on data at the first site may be identified, logged, and replicated to data stored at the second site. In another embodiment, data may be processed via one or more computing operations/one or more computing nodes at the first site, and the second site may comprise a backup (e.g., disaster recovery) site for the first site.

Further, in one embodiment, a gateway node may perform the logging and replication of the operations. For example, an application node within the first site may generate a remote procedure call (RPC) for an operation when the operation is performed on data within the first site. In another example, the RPC may be received by the gateway node. In response, the gateway node may add the operation associated with the RPC to a queue (e.g., a normal replication queue).

Further still, in one embodiment, the gateway node may retrieve operations from the queue and may replicate the operations to the second site. In this way, the second site may maintain an up-to-date copy of data stored at the first site. In another embodiment, the copy stored at the second site may be used to recover data lost at the first site. In yet another embodiment, the gateway node may include a hardware computing device (e.g., a server, etc.).

Also, in one embodiment, the old gateway node may include a gateway node of the first site that has failed. For example, a failure of the old gateway node may include physical failure of one or more hardware components of the gateway node. In this case, the old gateway node may be a different physical node from the new gateway node. In another example, failure of the old gateway node may include a replication error of the gateway node (e.g., in which the normal replication queue is dropped, etc.). In this case, the old gateway node may be the same physical node as the new gateway node.

In another embodiment, initializing the new gateway node may include bringing the new gateway node online, implementing one or more stored settings of the new gateway node, etc.

In addition, method 500 may proceed with operation 504, where a list of dirty directories at the first site is created at the new gateway node. In one embodiment, the new gateway node may create a snapshot of the current file system within the first site. In another embodiment, new gateway node may identify all dirty directories within the snapshot.

For example, a dirty directory may include a directory that includes data (e.g., files and/or objects) that have been altered at the first site but not synchronized with the second site. In another example, a dirty bit may be set of a directory to indicate that the directory is a dirty directory. For example, the new gateway node may identify all directories within the snapshot that contain a dirty bit.

Furthermore, in one embodiment, the new gateway node may sort all identified directories within the snapshot by their inode number. In another embodiment, the list of dirty directories may include a list of the sorted identified directories. In yet another embodiment, the list of dirty directories may include all directories at the first site that need to be synchronized at the second site (e.g., all directories that are out of sync with the second site, etc.).

Further still, method 500 may proceed with operation 506, where all directories within the list of dirty directories are synchronized with a second site by a background thread at the first site. In one embodiment, the background thread may start at a beginning of the list of dirty directories, and may individually synchronize each dirty directory in the list. In another embodiment, the background thread may select a first directory, synchronize all data in the directory with a second site, and remove the first directory from the list of dirty directories. In yet another embodiment, the background thread may utilize a first queue (e.g., a priority queue, etc.) to synchronize data within directories of the list.

Also, method 500 may proceed with operation 508, where new operations performed within the first site after the initialization of the new gateway node are synchronized with the second site by a foreground thread at the first site. In one embodiment, the new gateway node may queue the new operations performed within the first site after the initialization of the new gateway node.

For example, the new operations may be queued in the order they are received. In another example, an application node within the first site may perform an operation on data within the file system of the first site. In yet another example, the application node may generate a remote procedure call (RPC) for the operation when the operation is performed on the data. In still another example, the operation may then be added to a second queue (e.g., a normal replication queue, etc.) in response to the RPC. For instance, the second queue may be separate from the first queue.

Additionally, in one embodiment, the foreground thread may include a foreground queueing thread that is implemented within the new gateway node. In another embodiment, for each new operation within the second queue, before synchronizing the new operation, the foreground thread may compare the new operation to the list of dirty directories.

Further, in one embodiment, if the comparison indicates that the new operation is performed on data within a directory that matches a dirty directory within the list of dirty directories, the background thread may be notified of the matching dirty directory. In another embodiment, a synchronization of the matching dirty directory may be implemented by the background thread. In yet another embodiment, the synchronization of the matching dirty directory may be prioritized over other dirty directories within the list of dirty directories.

Further still, in one embodiment, once the matching dirty directory has been synchronized, the dirty directory may be removed from the list of dirty directories by the background thread, and the foreground thread may be notified that the new operation can be synchronized. In another embodiment, the foreground thread may then synchronize the new operation with the second site. In still another embodiment, if the comparison indicates that the new operation is performed on data within a directory that does not matches any dirty directory within the list of dirty directories, the foreground thread may immediately synchronize the new operation with the second site without informing the background thread.

In this way, by individually synchronizing all dirty directories after a gateway node fails, a number of computation operations needed to perform correct replication, as well as a size of memory necessary to perform the replication, may be reduced. Additionally, the dirty directories may be synchronized in parallel with the new operations, while maintaining consistency between the two. This may improve a performance of one or more computing devices performing the synchronization and gateway node recovery.

Figure 6:
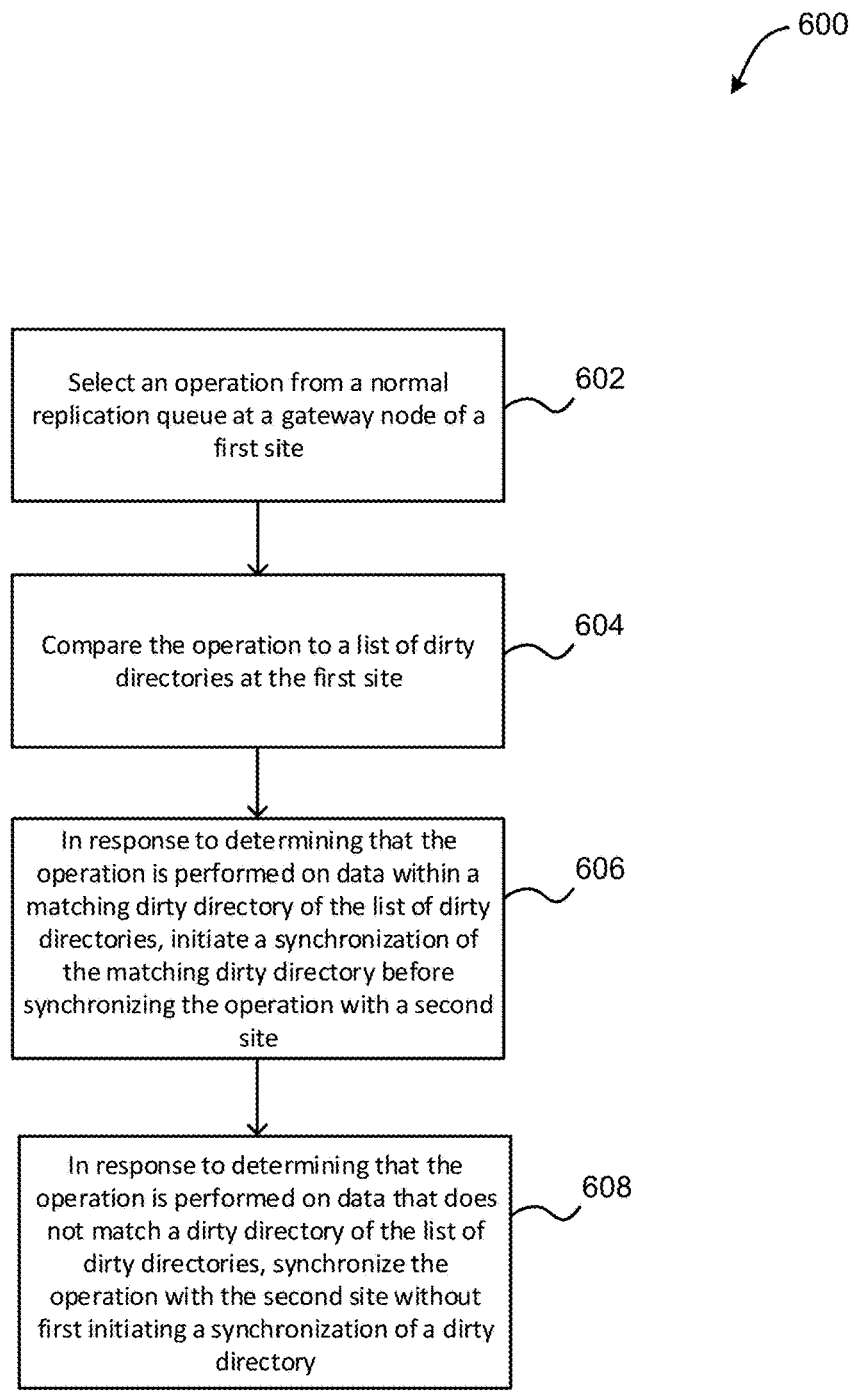
FIG. 6 illustrates a flowchart of a method for maintaining replication consistency after node failure, in accordance with one embodiment of the present invention.

Now referring to FIG. 6, a flowchart of a method 600 for maintaining replication consistency after node failure is shown according to one embodiment. The method 600 may be performed in accordance with the present invention in any of the environments depicted in FIGS. 1-4 and 7, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where an operation is selected from a normal replication queue at a gateway node of a first site. In one embodiment, operations may be organized in the queue according to the time they are added. For example, the normal replication queue may include a first in, first out (FIFO) queue. In another embodiment, the operation may be selected from the top of the normal replication queue. In yet another embodiment, the normal replication queue may store operations to be replicated from the first site to a second site.

Additionally, method 600 may proceed with operation 604, where the operation is compared to a list of dirty directories at the first site. In one embodiment, the list of dirty directories may include a list of all directories at the first site that need to be synchronized at the second site in response to an earlier failure of a gateway node of the first site. In another embodiment, the dirty directories within the list of dirty directories may be synchronized with the second site using a priority queue separate from the normal replication queue.

Further, method 600 may proceed with operation 606, where in response to determining that the operation is performed on data within a matching dirty directory of the list of dirty directories, a synchronization of the matching dirty directory is initiated before synchronizing the operation with a second site. In one embodiment, initiating a synchronization of the matching dirty directory may include notifying a background thread of the first site to perform a synchronization of the matching dirty directory. In another embodiment, the matching dirty directory may be synchronized by the background thread before all other dirty directories within the list of dirty directories. Once it is determined that the matching dirty directory has been synchronized within the second site, the operation may then be synchronized with the second site by a foreground thread.

Further still, method 600 may proceed with operation 608, where in response to determining that the operation is performed on data that does not match a dirty directory of the list of dirty directories, synchronizing the operation with the second site without first initiating a synchronization of a dirty directory.

In this way, dirty directories resulting from node failure may be synchronized with a second site in parallel with operations queued after the node failure, while maintaining consistency between the operations and the dirty directories. This may improve a performance of data synchronization between a first and second site.

Figure 7:
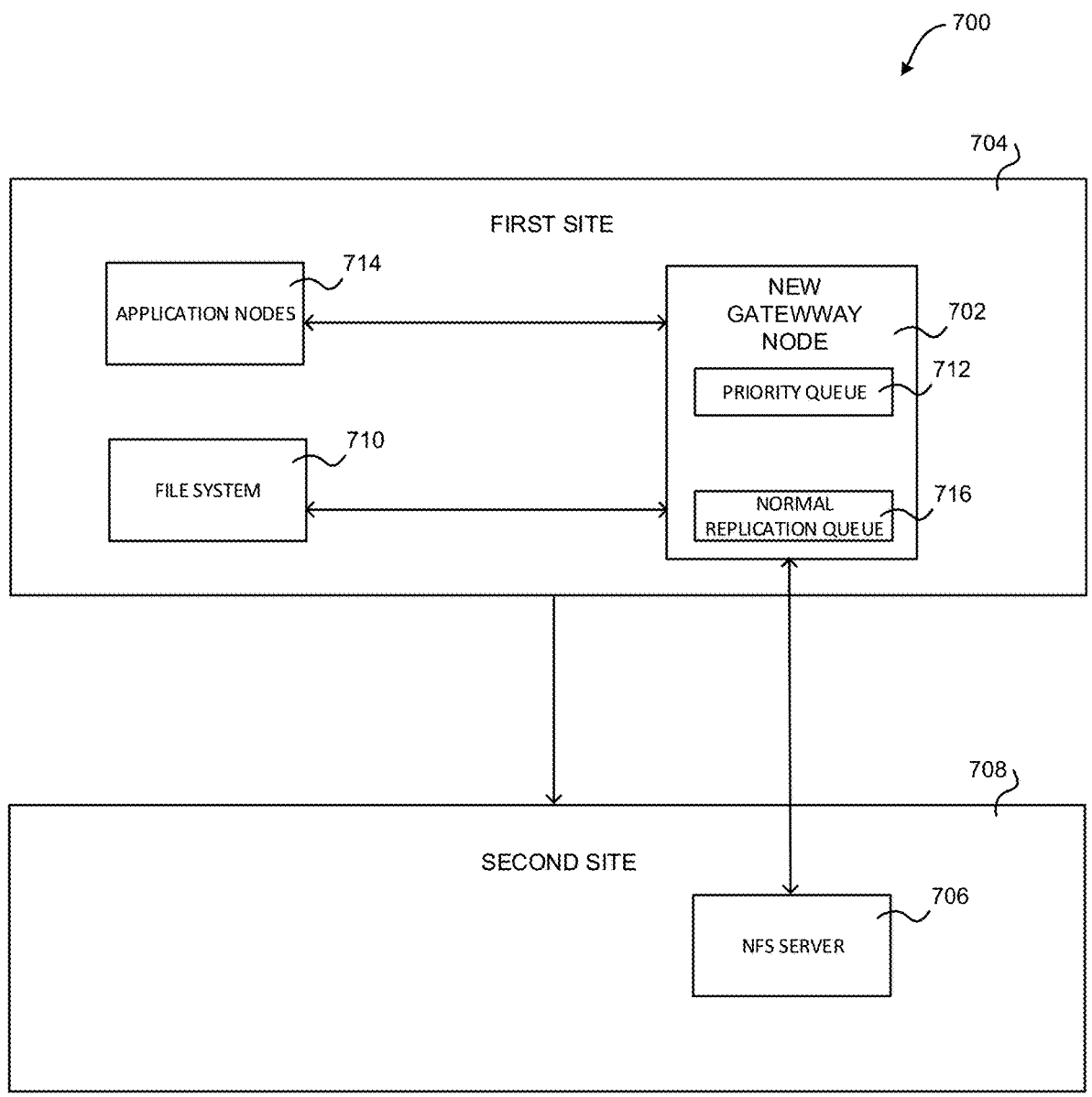
FIG. 7 illustrates an exemplary asynchronous replication environment, in accordance with one embodiment of the present invention.

FIG. 7 illustrates an exemplary asynchronous replication environment 700, according to one exemplary embodiment. As shown, a new gateway node 702 of a first site 704 manages the replication of data to a network file system (NFS) server 706 of a second site 708. In one embodiment, the new gateway node 702 may be implemented in response to the failure of an earlier gateway node within the first site 704.

Additionally, in one embodiment, in response to an earlier gateway node failure, the new gateway node 702 may create a snapshot of the current file system 710 of the first site 704. The new gateway node 702 may then identify all dirty directories within the snapshot and may create a list of dirty directories based on the identification.

Further, in one embodiment, the new gateway node 702 may synchronize all dirty directories with the second site 708. For example, the new gateway node 702 may individually select (via a background thread) a single directory from the list of dirty directories, add data within the directory to a priority queue 712, and replicate the data within the directory from the priority queue 712 to an NFS server 706 of the second site 708. Once the single directory has been replicated, the single directory may be removed from the list of dirty directories, and another single directory may be selected for replication.

Further still, in one embodiment, the new gateway node 702 may also synchronize new operations performed within the first site 704 after the failure of the earlier gateway node. For example, application nodes 714 within the first site 704 may generate RPCs identifying operations performed by the application nodes 714 on data within the file system 710. These RPCs may be received by the new gateway node 702, and their associated operations may be added (in a FIFO order) to a normal replication queue 716 of the new gateway node 702.

In another embodiment, the replication of operations utilizing the normal replication queue 716 may be performed in parallel with the synchronization of dirty directories utilizing the priority queue 712.

Also, in one embodiment, the new gateway node 702 may pop an operation from the top of the normal replication queue 716 and compare the popped operation with the list of dirty directories. If the popped operation is performed on data within one of the dirty directories in the list of dirty directories, the associated dirty directory is automatically added by the new gateway node 702 to the priority queue 712 (regardless of its ranking within the list of dirty directories) and is automatically synchronized by the new gateway node 702 with the second site 708. Once the associated dirty directory is synchronized, it is removed from the list of dirty directories, and the popped operation is replicated by the new gateway node 702 at the second site 708.

In addition, if the popped operation is performed on data that is not located within one of the dirty directories in the list of dirty directories, the popped operation is immediately replicated by the new gateway node 702 at the second site 708 without disrupting the priority queue 712.

In this way, dirty directory synchronization may be performed in parallel with new operation replication, without conflict between the two.

Continuous Replication of Backlog and Newly Generated Data Together on Failure of Replicator Node in Asynchronous Replication Setup In asynchronous replication environments, one site is designated as the production cluster (e.g., cache site) and another site is designated as a receiving site (e.g., the disaster recovery (DR) site, the home site, etc.). The production site captures all operations being done to the local file set/filesystem and maintains a local queue of operations in a first-come-first-queue order. This queue is maintained on just one node in the production (cache) site cluster which is designated as the gateway node (which maintains the replication queue in memory on this one node). All the application nodes are seen to generate an RPC when a local operation is performed, so that the RPC updates the designated gateway node with the operation that was performed on the file set.

Since all of this queue is kept in-memory, a failure to hold this data until replication completes can trigger a ripple effect. This failure starts a backlog of data to be synchronized from the production site to the DR site. Meanwhile, applications at the production site are generating additional data to be synchronized with the DR site. This creates a sizable backlog for the gateway node to synchronize with the DR, such that a condition may occur where the two sites can never be fully in sync. Because the gateway node spends too much time building the list of operations to queue, or queues too many operations, it may take too long to replicate to the DR site while accommodating new application generated operations.

This problem occurs when the in-memory queue is lost, either when the gateway node fails, or when a replication error occurs, forcing the queue to be dropped.

There are currently two ways to recover from node failure. The first way includes going through the entire list of inodes in the file set/file system to identify which files need to be synchronized to the remote site. The process includes identifying, at the cache/primary/production site, all the inodes having updates that have not been replicated to the remote site. In many cases this involves running an exhaustive policy scan to go through all the inodes in the cache/primary/production site and identifying those with special inode bits denoting each missed operation.

Though the scan may reveal most of the missed operations, there may be one or more renamed or removed files which need to be identified. The process of identifying these renames/removes involves taking a complete list of dirty directories at the cache/primary/production site (e.g., a dirty bit is marked on the directory when a file is removed from the directory or renamed out of/into the directory). Next, a complete readdir is performed on all the dirty directories at the cache/primary/production site and at the home/secondary/DR site. Both the lists are sorted in order of the inode numbers at the home/DR/Secondary site (the primary/production/Cache site also has the home/DR/secondary inode counterpart stored locally).

Once both the lists are generated, an exhaustive single threaded process reviews each inode on the cache list and compares it against the corresponding home list to see if the inode has been renamed/removed/unchanged. This is a time and resource-intensive process. Although the final list of inodes needing replication may be small, the entire process to identify those inodes is large. The process of identifying the renamed/removed entries is massively single threaded.

The second way to recover from node failure includes reviewing the entire cache list, and resynchronizing everything from the primary/production cluster over to the secondary/DR Site using a priority queue. The process of resynchronizing all the data from the production/cache site to the DR/home site is done by running a file set/file system level policy to generate all directories and all files in the given file set/file system that need to be stored on the gateway node's local filesystem (two lists of files—one for all directories and one for all files). Later, the gateway node needs to assign enough memory to hold all the generated operations into an in-memory queue (priority queue).

Resynchronizing the list of all inodes in the filesystem is costly both in terms of local disk space (to store all inode details temporarily for queueing purpose) and in terms of node memory (in order to form a queue to play through). This may result in a Synchronization halt between the two sites. The cost is exceptionally great where the file set/file system under consideration has many inodes created on it already.

Additionally, with this complete re-synchronization, extra files may be left over at the DR/home site (e.g., files that were renamed/removed at the cache/production site). This often leads to the home/DR site having a greater number of inodes than the cache/production site.

Core issues here include identifying the rename and remove operations. This may prove costly because renamed/removed inodes don't exist in their original form at the data originating site, making them hard to identify. This often demands one or more exhaustive comparisons to find the original name of those entries that were removed/renamed.

In many replication situations, when node failures do happen, the production/cache site and the DR/home site only tend to differ by few files/directories or few blocks of data on a single file. However, in order to get these two sites synchronized, a time and resource-intensive change list may need to be computed, while new operations are kept on hold.

As a result, live production data may not make it to the DR site in time (because the priority queue needs to be completed before the normal queue of operations may be replicated). This may result in a non-synchronized system that takes a significant amount of time to correct (where this time may exceed a customer-defined threshold).

Exemplary Solution Overview

In one embodiment, after a node failure, both sites may be synchronized without halting the synchronization of post-failure operations from the cache site to the home site. This may be done by focusing on one directory at a time to be synchronized in the background, while the post-failure queue of operations that are generated can keep flushing to the home site in the foreground. Should the post-failure queue involve an operation on data within a directory that is not properly in sync with the home site, an on demand synchronization may be performed of only that directory before synchronizing the operation.

One exemplary solution synchronizes only one directory at a time. This may be done only if the file set/file system in question is in need of a complete synchronization back with its remote site when the in-memory queue built for replication has been lost.

Such a directory-wise synchronization may be performed by two entities within the cache site. A background thread may start from a first identified directory organized in a list in ascending order of local inode number, and may proceed until the last directory in that list. The background thread may scan through each directory at the production site to maintain synchronization with the remote site.

Additionally, an on-demand sync may be performed on a per-directory basis. When an operation is performed on a given directory, its completeness with its remote counterpart may be validated before moving on to the next operation in the queue.

When the production site's queue of operations held on the gateway node is lost, a new gateway node may take up the file set/file system's replication (or the node which lost the queue may continue to operate as the gateway node for the file set if the queue was lost due to memory pressure, an out-of-memory (OOM) killer seeing that the memory usage is beyond allowance, or a replication error which caused the queue to be dropped and a complete resync was called for). The new gateway node may make a special state of the file set, which calls for a continuous replication state, where the new gateway node creates a snapshot of the file set/file system at the given point in time, and takes note of all the directories there at that point in time. The list of directories is sorted in order local inode number. The file set may then be opened up for I/O (e.g., new operations from application nodes), and incoming operations on the file set/file system may be captured. The gateway node may then continue its role of capturing and replicating all the incoming I/O requests.

Additionally, the gateway node may start a background thread which goes through the list of snapshot directories. For each identified directory, the background thread may ensure that the given directory is synchronized between the cache/production site and the home/DR site.

Further, the new gateway node may identify post-failure operations on data within directories which are part of the required re-sync list. In response to this identification, the background thread may be notified of such directories, and may prioritize the synchronization of such directories. Once the directories have been synchronized, the post-failure operations may be replicated.

The actual re-synchronization of each of the directories may be performed as follows:
Move all files in the remote counterpart of the directory given to a temporary directory within the file system/file set.
Reuse all files within the directory at the home/DR site that are relevant to the current state of the Production/Cache site.
Avoid data re-writes from the cache/production back to the DR/Home site.
Create/retain the same named directory at the required path at the DR/Home site.
This directory shall initially be empty.
This ensures that there are no dangling/unnecessary entries left at the start.
For each non-directory Mode encountered in the production/cache site's directory (sorted in ascending order of Mode numbers within the selected directory)—an attempt is made to identify the Mode at the home/DR site. If the Mode exists:
Match the entity names, size of file/object, mtime on the file/object at the Home/DR Site and the mtime of the remote file/object retained on the local inode at production/cache site.
If all these match exactly, then the entity is not changed—create a hard link of the file/object into the empty directory and remove the file/object in the temporary directory.
If there is a mismatch, the cache/Production site synchronizes the entire file/object into the new directory at the home/DR Site.
At the end, the entire temporary directory shall be removed (along with its contents) because any reusable entity has already moved into the actual new directory and anything left is unusable.
For each normal queue operation, the thread that is trying to synchronize the operation needs to verify that the parent directory of the entity is not present in the required re-synchronize list maintained on the node. The required re-synchronize state of the file set/file system may end when all entries in the required re-synchronize list are removed.

In this way, an exhaustive review of the entire list of inodes in the file system to identify and replicate only data/inodes that needs synchronizing may be avoided. Additionally, exhaustive comparison operations to identify the original names of those inodes that have been removed/renamed may also be avoided.

Additionally, memory needs/efficiency may be improved, since only one dirty directory is resolved at a time. Further, synchronization recovery may be performed by a background thread in parallel with the replication of newly incoming operations while managing any conflicts between the two.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   initializing a new gateway node at a first site in response to a failure of an old gateway node at the first site;
   creating, at the new gateway node, a list of dirty directories at the first site, including:
      creating a snapshot of a current file system within the first site, and
      identifying all dirty directories within the snapshot, wherein each of the dirty directories includes a directory that includes data altered at the first site but not synchronized with a second site;
   synchronizing, with the second site by a background thread at the first site, all directories within the list of dirty directories; and
   synchronizing, with the second site by a foreground thread at the first site, new operations performed within the first site after the initialization of the new gateway node.

2. The computer-implemented method of claim 1, further comprising:
selecting an operation from a normal replication queue at the new gateway node of the first site;
comparing the operation to the list of dirty directories at the first site;
in response to determining that the operation is performed on data within a matching dirty directory of the list of dirty directories, initiating a synchronization of the matching dirty directory before synchronizing the operation with a second site; and
in response to determining that the operation is performed on data that does not match a dirty directory of the list of dirty directories, synchronizing the operation with the second site without first initiating a synchronization of a dirty directory.

3. The computer-implemented method of claim 1, wherein the first site and the second site are located in different physical locations.

4. The computer-implemented method of claim 1, wherein:
the new gateway node creates a snapshot of a current file system within the first site,
the new gateway node identifies all dirty directories within the snapshot, and
the list of dirty directories includes a list of sorted identified dirty directories.

5. The computer-implemented method of claim 1, wherein the list of dirty directories includes all directories at the first site that need to be synchronized at the second site.

6. The computer-implemented method of claim 1, wherein the background thread starts at a beginning of the list of dirty directories, and individually synchronizes each dirty directory in the list.

7. The computer-implemented method of claim 1, wherein the new gateway node queues the new operations performed within the first site after the initialization of the new gateway node.

8. The computer-implemented method of claim 1, wherein first site is an on-premises site, and the second site is a cloud-based site.

9. The computer-implemented method of claim 1, wherein the second site maintains a copy of data found at the first site.

10. The computer-implemented method of claim 1, wherein operations being performed on data at the first site are identified, logged, and replicated to data stored at the second site.

11. The computer-implemented method of claim 1, wherein
each of the dirty directories includes a predetermined set bit.

12. The computer-implemented method of claim 1, wherein the failure of the old gateway node includes a physical failure of one or more hardware components of the old gateway node, and the old gateway node is a different physical node from the new gateway node.

13. A computer program product comprising one or more computer readable storage media, and program instructions collectively stored on the one or more computer readable storage media, the program instructions comprising instructions configured to cause one or more processors to perform a method:
initializing a new gateway node at a first site in response to a failure of an old gateway node at the first site, utilizing the one or more processors;
creating, at the new gateway node, a list of dirty directories at the first site, utilizing the one or more processors, including:
creating a snapshot of a current file system within the first site, and
identifying all dirty directories within the snapshot, wherein each of the dirty directories includes a directory that includes data altered at the first site but not synchronized with a second site;
synchronizing, with the second site by a background thread at the first site, all directories within the list of dirty directories, utilizing the one or more processors; and
synchronizing, with the second site by a foreground thread at the first site, new operations performed within the first site after the initialization of the new gateway node, utilizing the one or more processors.

14. The computer program product of claim 13, further comprising:
selecting an operation from a normal replication queue at the new gateway node of the first site, utilizing the one or more processors;
comparing the operation to the list of dirty directories at the first site, utilizing the one or more processors;
in response to determining that the operation is performed on data within a matching dirty directory of the list of dirty directories, initiating a synchronization of the matching dirty directory before synchronizing the operation with a second site, utilizing the one or more processors; and
in response to determining that the operation is performed on data that does not match a dirty directory of the list of dirty directories, synchronizing the operation with the second site without first initiating a synchronization of a dirty directory, utilizing the one or more processors.

15. The computer program product of claim 13, wherein the first site and the second site are located in different physical locations.

16. The computer program product of claim 13, wherein:
the new gateway node creates a snapshot of a current file system within the first site,
the new gateway node identifies all dirty directories within the snapshot, and
the list of dirty directories includes a list of sorted identified dirty directories.

17. The computer program product of claim 13, wherein the background thread starts at a beginning of the list of dirty directories, and individually synchronizes each dirty directory in the list.

18. The computer program product of claim 13, wherein the new gateway node queues the new operations performed within the first site after the initialization of the new gateway node.

19. A system, comprising:
a processor; and
logic integrated with the processor, executable by the processor, or integrated with and executable by the processor, the logic being configured to:
initialize a new gateway node at a first site in response to a failure of an old gateway node at the first site;
create, at the new gateway node, a list of dirty directories at the first site, including:
creating a snapshot of a current file system within the first site, and
identifying all dirty directories within the snapshot, wherein each of the dirty directories includes a directory that includes data altered at the first site but not synchronized with a second site;

synchronize, with the second site by a background thread at the first site, all directories within the list of dirty directories; and synchronize, with the second site by a foreground thread at the first site, new operations performed within the first site after the initialization of the new gateway node.

* * * * *